US010846553B2

(12) United States Patent
Hoehne et al.

(10) Patent No.: US 10,846,553 B2
(45) Date of Patent: Nov. 24, 2020

(54) RECOGNIZING TYPEWRITTEN AND HANDWRITTEN CHARACTERS USING END-TO-END DEEP LEARNING

(71) Applicant: SAP SE, Walldorf (DE)

(72) Inventors: Johannes Hoehne, Berlin (DE); Christian Reisswig, Berlin (DE); Anoop Raveendra Katti, Berlin (DE); Marco Spinaci, Berlin (DE)

(73) Assignee: SAP SE, Walldorf (DE)

( * ) Notice: Subject to any disclaimer, the term of this patent is extended or adjusted under 35 U.S.C. 154(b) by 128 days.

(21) Appl. No.: 16/359,012

(22) Filed: Mar. 20, 2019

(65) Prior Publication Data
US 2020/0302208 A1   Sep. 24, 2020

(51) Int. Cl.
*G06K 9/34* (2006.01)
*G06K 9/00* (2006.01)
*G06N 3/08* (2006.01)
*G06N 20/00* (2019.01)

(52) U.S. Cl.
CPC ......... *G06K 9/344* (2013.01); *G06K 9/00463* (2013.01); *G06N 3/08* (2013.01); *G06N 20/00* (2019.01); *G06K 2209/01* (2013.01)

(58) Field of Classification Search
CPC .......... G06K 9/00442; G06K 9/00456; G06K 9/00463; G06K 9/00852; G06K 9/34; G06K 9/344; G06K 2209/01; G06T 7/10; G06T 7/194; G06T 2207/20084; G06T 2207/20112; G06T 2207/30176; G06N 3/02

See application file for complete search history.

(56) References Cited

U.S. PATENT DOCUMENTS

| | | | | |
|---|---|---|---|---|
| 2018/0322339 A1* | 11/2018 | Cohen et al. | ........... | G06K 9/627 |
| 2019/0130232 A1* | 5/2019 | Kaasila et al. | ....... | G06K 9/6271 |
| 2019/0251192 A1* | 8/2019 | Govindaraj et al. | ......................... G06F 16/5846 | |

FOREIGN PATENT DOCUMENTS

| | | |
|---|---|---|
| WO | WO 2007/022460 A2 | 2/2007 |
| WO | WO 2017/163230 A1 | 9/2017 |

OTHER PUBLICATIONS

Brad Neuberg, "Creating a Modern OCR Pipeline Using Computer Vision and Deep Learning," Apr. 12, 2017, 15 pages, available at https://blogs.dropbox.com/tech/2017/04/creating-a-modern-ocr-pipeline-using-computer-vision-and-deep-learning/.

Nicholas T. Smith, "Deep Learning OCR using TensorFlow and Python," Oct. 14, 2017, 5 pages, available at https://nicholastsmith.wordpress.com/2017/10/14deep-learning-ocr-using-tensorflow-and-python/.

Ray Smith, "An Overview of the Tesseract OCR Engine," 2007, 5 pages, available at https://static.googleusercontent.com/media/research.google.com/de/pubs/archive/33418.pdf.

Andrew Kae et al., "Improving State-of-the-Art OCR through High-Precision Document-Specific Modeling," 2010, 8 pages, available at http://vis-www.cs.umass.edu/papers/kae_cvpr_10.pdf.

Katti et al., "Chargrid: Towards Understanding 2D Documents", arxiv.org, Cornell University Library, Sep. 24, 2018, XP081194525; 11 pages.

Lecun Y et al., "Gradient-Based Learning Applied to Document Recognition", Proceedings of the IEEE, IEEE. New York, US, vol. 86, No. 11, Nov. 1, 1998, XP000875095; pp. 2278-2323.

Pengyuan et al., "Mask TextSpotter: An End-to-End Trainable Neural Network for Spotting Text with Arbitrary Spotting Text with Arbitrary Shapes", arvix.org, Cornell University Library, Jul. 6, 2018, XP081261746; 18 pages.

Extended European Search Report directed to European Patent Application No. 19204763.7, dated May 25, 2020; 12 pages.

\* cited by examiner

*Primary Examiner* — Andrew W Johns
(74) *Attorney, Agent, or Firm* — Sterne, Kessler, Goldstein & Fox P.L.L.C.

(57) ABSTRACT

Disclosed herein are system, method, and computer program product embodiments for optical character recognition using end-to-end deep learning. In an embodiment, an optical character recognition system may train a neural network to identify characters of pixel images, assign index values to the characters, and recognize different formatting of the characters, such as distinguishing between handwritten and typewritten characters. The neural network may also be trained to identify, groups of characters and to generate bounding boxes to group these characters. The optical character recognition system may then analyze documents to identify character information based on the pixel data and produce segmentation masks, such as a type grid segmentation mask, and one or more bounding box masks. The optical character recognition system may supply these masks as an output or may combine the masks to generate a version of the received document having optically recognized characters.

20 Claims, 9 Drawing Sheets

RECOGNIZING TYPEWRITTEN AND HANDWRITTEN CHARACTERS USING END-TO-END DEEP LEARNING

CROSS-REFERENCE TO RELATED APPLICATIONS

This application is related to U.S. patent application Ser. No. 16/123,177 filed Sep. 6, 2018, entitled "Optical Character Recognition Using End-to-End Deep Learning" which is hereby incorporated by reference in its entirety.

BACKGROUND

One type of image to text conversion includes optical character recognition (OCR). OCR uses steps such as de-skewing, de-speckling, binarization, line removal, and/or layout analysis followed by character recognition or post-processing. Using multiple steps, however, leads to potential errors such as information loss or distortion in intermediate steps. This information loss or distortion may also especially occur when attempting to recognize handwritten characters in the intermediate steps. These OCR processes may yield erroneous predictions that may not be later corrected, especially when steps are applied sequentially. Further, the sequential nature of OCR results in a time-intensive process that uses significant computational costs.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for optical character recognition using machine learning. The embodiments disclosed herein may process and/or extract character information from documents including handwritten and/or typewritten characters.

In an embodiment, an optical character recognition (OCR) system may utilize a neural network architecture. This neural network architecture may allow for the conversion of images of handwritten and/or typewritten text into characters with a single model and a single computational step. The neural network may receive an image as an input and may output the set of characters found in the image, the position of the characters on the image, and/or bounding boxes for characters, words, or lines. Using these outputs or a subset of these outputs may allow the OCR system to generate a document with optically recognized text. The OCR system is able to analyze documents having handwritten and/or typewritten text.

The OCR system may recognize characters in a document in a manner faster than existing sequential approaches to OCR processing. The neural network architecture may reduce the number of steps performed to process a document. Further, the neural network may offer robustness against possible noise or distortions during processing. Based on the training performed, the neural network may be flexible and adaptable to various types of data, symbols, languages, and characters. The training also allows the neural network to distinguish between handwritten and typewritten text.

Because the neural network may process the complete document in a single step, the OCR system may incorporate the global context of surrounding characters, words, paragraphs, and/or the overall structure of the document to identify or characterize particular characters. The single step configuration may allow for faster document processing as well as a reduced cost in computational resources. Further, by removing the multiple step or multiple state configuration, the OCR system may avoid potential errors that may arise during intermediary processing steps. This configuration also avoids potential errors when attempting to recognize handwritten text. Because the OCR system performs end-to-end processing using deep learning models from the neural network, these intermediary errors may be avoided.

Various embodiments of these features will now be discussed with respect to the corresponding figures.

Figure 1:
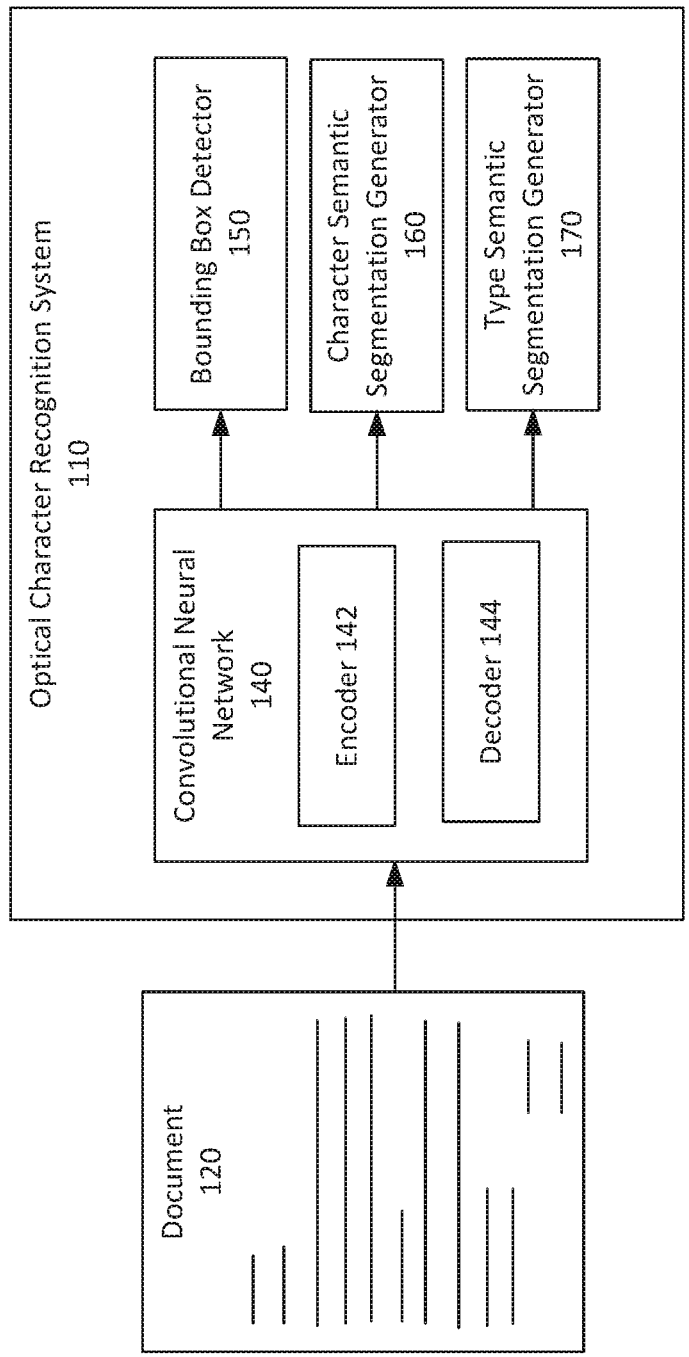
FIG. 1 depicts a block diagram of an optical character recognition environment, according to some embodiments.

FIG. 1 depicts a block diagram of an optical character recognition (OCR) environment 100, according to some embodiments. OCR environment 100 may include optical character recognition (OCR) system 110 and document 120. Document 120 may include handwritten and/or typewritten text. OCR system 110 may recognize text and/or characters from document 120. OCR system 110 may accept document 120 as an input. OCR system 110 may produce a version of document 120 as an output having optically recognized text. In an embodiment, OCR system 110 may produce one or more segmentation masks and/or bounding boxes as an output. The output of OCR system 110 may be utilized by a computer system to perform further document processing.

OCR system 110 may be implemented using one or more processors and/or may include hardware and/or software that may be configured to recognize characters of document 120. In an embodiment, OCR system 110 may be implemented using computer system 500 as further described with reference to FIG. 5. Document 120 may be a computer file, document, image, and/or other digital file or object including text information that may be extracted. Document 120 may include handwritten and/or typewritten text. Examples of document 120 may include a webpage, printed papers, publications, an invoice, an instruction manual, a slideshow presentation, hand-written notes, and/or other images including text characters, to name just some examples. An embodiment of document 120 is described with reference to FIG. 2A. Typewritten text may refer to text that is not handwritten. Examples of typewritten text include, but are not limited to, text typed using a keyboard, text generated from a typewriter, printed text, and/or text generated from a printing press or other early forms of prints.

The text information in document 120 may include characters that are organized or unorganized. Document 120 may include characters with predetermined arrangements such as lines, characters that do not follow a predetermined arrangement, and/or characters mixed with graphical images. The characters may take the form of one or more alphabets, letters, numbers, symbols, and/or other images. OCR system 110 may be trained to recognize characters based on the visual images and training that may occur prior to the processing of document 120. This training may include the recognition of handwritten and/or typewritten text.

A "character" may refer to letters, numbers, symbols, words, a collection or combination of letters, numbers, and/or symbols, symbolic mark, an image, and/or other visual indicator on document 120. OCR system 110 may convert an identified character to an index value. The index value may correspond, for example, to a ASCII value or a dictionary of words. The conversion may use a mapping function to assign the index value. OCR system 110 may mask the character using the index value. In an embodiment, because a character may occupy a size measured by [width of pixels×height of pixels], masking the character may include representing the area with the index value. OCR system 110 may apply this process to each character of the document to generate a segmentation mask.

In an embodiment, document 120 may include handwritten and typewritten text. OCR system 110 may correlate identified characters in both handwritten and typewritten characters to the same index value. For example, if document 120 include the letter "E" in both the handwritten and typewritten form, OCR system 110 may use the same index value to identify each instance of the letter. In this manner, OCR system 110 may recognize both types of characters and map them to the same index value.

When generating segmentation masks, OCR system 110 may apply downsampling techniques to reduce the resolution of a segmentation mask relative to the image size of document 120. In this manner, the scaling may be different. A lower resolution segmentation mask may allow for increased processing speed when analyzing the mask and/or may reduce the storage size of the mask. In an embodiment, the sampling may allow for differences in scaling in the horizontal and vertical directions. Depending on the training of OCR system 110, different resolutions may be applied to different directions of the mask. For example, a more fine grained resolution may be applied to the horizontal scale while the vertical scale may have a lower resolution. In this example, the downsampling may be applied to the vertical scale but not the horizontal scale. This configuration may apply to documents with text or sentences running horizontally. The higher horizontal resolution may allow finer character details to be captured. Down sampling the vertical scale, however, allows for increased speed in processing due to the smaller segmentation mask size.

To perform character recognition processing, OCR system 110 may use convolution neural network (CNN) 140, bounding box detector 150, character semantic segmentation generator 160, and/or type semantic segmentation generator 170. CNN 140 may receive document 120. To receive document 120, a user may supply a command to OCR system 110 to perform an OCR process on document 120. Using CNN 140, OCR system 110 may identify characters to generate one or more segmentation masks and/or identify words to generate bounding boxes. OCR system 110 may combine these layers to generate an OCR version of the document.

CNN 140 may be an artificial intelligence network and/or may apply machine learning algorithms to identify desired characters and/or aspects of document 120. CNN 140 may be trained using training document examples to recognize characters as well as pixel information to identify groups of characters, such as, for example, words, lines, or sentences. The training documents may also train CNN 140 to distinguish between characters that are typewritten and characters that are handwritten. OCR system 110 may use this information to generate a segmentation mask distinguishing between handwritten and typewritten text. The training and pixel recognition may also allow OCR system 110 to correlate characters in handwritten text with characters in typewritten text and identify characters that are the same with the same index value.

Based on this training, CNN 140 may produce one or more segmentation masks and/or bounding boxes to generate the OCR version of the document. A type of segmentation mask may be a "character grid" that may be a version of document 120 where the characters are replaced with an index value. An embodiment of this character grid segmentation mask is discussed further with respect to FIG. 2B. Another type of segmentation mask may be a "type grid" that may be a version of document 120 where pixels are identified as being handwritten, typewritten, and/or as being part of the background of document 120. An embodiment of a type grid segmentation mask is discussed further with respect to FIG. 2C. The bounding boxes may be a version of document 120 with location information indicating the space occupied by characters or groups of characters. Embodiments of bounding boxes are discussed further with respect to FIG. 2D and FIG. 2E. Producing these two document 120 structures may lead to increased processing of document 120 to expend fewer resources when recognizing text.

CNN 140 may utilize an encoder 142 and/or a decoder 144 to perform processing to generate the one or more segmentation masks and/or bounding boxes. Encoder 142 may aid in the creation of a character grid segmentation mask by replacing characters of document 120 with an index value. The index value may be assigned according to a mapping function. For example, encoder 142 may use a predefined dictionary to map the character "A" to an index value of "65" or "0x41," Encoder 142 may have been trained to associate pixel images of characters directly with an index value. For example, encoder 142 may have been trained to identify the pixels of a hand-written version of the character "A" and associate the pixel image with the index value. Encoder 142 may map identified characters including letters, numbers, and/or symbols to corresponding index values. Encoder 142 may perform this mapping on characters between multiple languages depending on the mapping functions and/or dictionaries utilized when training encoder 142. In an embodiment, the type grid segmentation mask may also be used to group a first subset of characters from a first language while grouping a second subset of characters from a second language.

Figure 4:
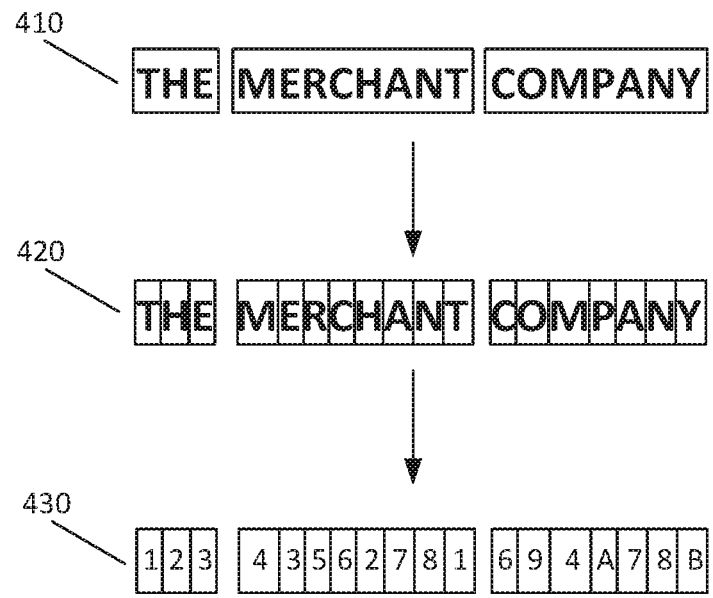
FIG. 4 depicts a block diagram of an example character processing flow, according to some embodiments.

FIG. 4 depicts an example embodiment demonstrating the conversion of string 420 into string 430 having an index value corresponding to the characters. When generating the segmentation mask, the index values may replace the pixel area occupied by the characters. OCR system 110 may assign index values for each character of document 120. For example, the character "M" may map to an index value of "4". The collective index values along with the positioning information for the index values may comprise the character grid segmentation mask. In addition to indexing the characters, encoder 142 may identify a background class. The background class may refer to the background or "white space" of document 120 and may aid in distinguishing the index values from the background. This index hashing process using CNN 140 may allow for faster character recognition as well reducing computation resource expenditure relative to sequential OCR systems. CNN 140 may perform this character indexing on identified characters using encoder 142 and may use decoder 144 to combine the index values along with the background class to generate a segmentation mask.

CNN 140 may generate a type grid segmentation mask in a similar manner. CNN 140 may assign a value for pixel areas corresponding to handwritten characters, typewritten characters, and/or the background of document 120. These value assignments may designate particular text as typewritten or handwritten text. The collective demarcations of the values may comprise the type grid segmentation mask. In an embodiment, the character grid and the type grid may be combined into a shared segmentation mask. For example, the values corresponding to the characters may indicate both an index value as well as whether a character is handwritten or typewritten.

In addition to generating one or more segmentation masks, CNN 140 may determine bounding boxes in document 120. The bounding boxes may identify the location of particular characters, words, lines, and/or sentences of document 120. This location information may aid in the reconstruction of document 120 with character information as well as character location information to generate a version of document 120 with optically recognized text. For example, CNN 140 may generate bounding boxes around each identified character. These bounding boxes may be generated around both handwritten and/or typewritten characters. FIG. 4 provides an example of typewritten characters, but CNN 140 may apply the same process to handwritten characters.

In an embodiment, CNN 140 may determine bounding boxes in document 120 around words. A word bounding box may represent a pixel area (e.g., width×height) occupied by the word. For example, referring to FIG. 4, CNN 140 may identify string 410 in document 120. CNN 140 may identify three separate words in this string as "THE", "MERCHANT", and "COMPANY". CNN 140 may recognize these words and associate each word with a word bounding box. CNN 140 may also identify the location of the word bounding boxes in document 120. For example, CNN 140 may utilize a coordinate system or a relative pixel location. CNN 140 may apply word bounding boxes to typewritten characters and/or handwritten characters.

In an embodiment, CNN 140 may divide word boxes into character boxes and convert string 410 intro string 420. For example, CNN 140 may identify the pixels within a word bounding box including distinct characters. In this manner, CNN 140 may convert the word box into character boxes. This division may maintain positioning information related to the characters.

In an embodiment, CNN 140 may directly identify character boxes. For example, CNN 140 may extract characters and pixel dimensions from document 120 without first identifying word boxes. In an embodiment, CNN 140 may utilize metadata associated with document 120 to identify the character boxes and/or the word boxes. Based on the analysis performed by CNN 140, OCR system 110 may recognize particular characters of document 120, the area occupied by the characters, and/or the location of the characters to construct a version of document 120 with optically recognized text. The characters recognized may be handwritten and/or typewritten.

In an embodiment, CNN 140 may directly identify line boxes and/or sentence boxes. A line bounding box may represent a pixel area (e.g., width×height) occupied by one or more words. For example, referring to FIG. 4, CNN 140 may identify the pixel area of string 410 "THE MERCHANT COMPANY" as a line. The line may include one or more words. CNN 140 may recognize this line based on training data. CNN 140 may determine a line bounding box around the pixel area determined for a line. In an embodiment, CNN 140 may recognize lines of handwritten and/or typewritten characters. For example, CNN 140 may identify a handwritten signature as a line. If document 120 is a diary entry or other handwritten manuscript, CNN 140 may identify lines of handwritten text.

Using the information derived by CNN 140, OCR system 110 may generate one or more segmentation masks using character semantic segmentation generator 160 and/or type semantic segmentation generator 170. In an embodiment, character semantic segmentation generator 160 and type semantic segmentation generator 170 may operate as two portions of a neural network or CNN 140 trained to generate two predictions. OCR system 110 may also generate bounding boxes using bounding box detector 150. OCR system 110 may use the one or more segmentation masks and/or the bounding boxes to construct a version of document 120 with optically recognized characters. In an embodiment, OCR system 110 may produce the one or more segmentation masks and/or bounding boxes as separate outputs. For example, OCR system 110 may supply these outputs to a document processing system configured to perform additional processing on document 120. For example, OCR system 110 may supply the one or more segmentation masks and/or bounding boxes to another neural network or another system using machine learning. Supplying these outputs may lead to faster computation and/or processing by the document processing system based on the indexed format of the segmentation mask and the location of the bounding boxes.

In generating the one or more segmentation masks and the bounding boxes, decoder 144 may use one or more branches to lead to character semantic segmentation generator 160, type semantic segmentation generator 170, and/or bounding box detector 150. Character semantic segmentation generator 160 may generate a 2D representation of the index values and may use patterns and/or colors to characterize characters of document 120 with their index value. An embodiment of this 2D representation is further described with reference to FIG. 2B as a character grid segmentation mask. A character grid segmentation mask may be visible to a user of OCR system 110 and/or may be a formatted file. The character grid segmentation mask may utilize a different pattern for each distinct character of document 120. The character grid segmentation mask may also identify a background. The background may aid in the distinction between different characters and may identify "white space" in document 120. Combining the characters of the character grid segmentation mask allows OCR system to product a 2D object that displays indexed character information.

Type semantic segmentation generator 170 may generate a 2D representation of the values indicating whether a character is typewritten, handwritten, and/or background. An embodiment of this 2D representation is further described with reference to FIG. 2C as a type grid segmentation mask. A type grid segmentation mask may be visible to a user of OCR system 110 and/or may be a formatted file. The type grid segmentation mask may utilize a different pattern for typewritten, handwritten, and/or background sections of document 120.

In addition to producing character grid and type grid segmentation masks, OCR system 110 may generate a bounding box mask. Embodiments of bounding box masks are described with reference to FIG. 2D and FIG. 2E. To generate a bounding box mask, OCR system 110 may utilize bounding box detector 150. Bounding box detector 150 may use an ultra-dense single stage detector to generate bounding boxes. The bounding boxes may represent delineations between characters or groups of characters. For example, bounding boxes may be drawn around individual characters, words, sentences, and/or lines. The bounding boxes may aid in accurately analyzing the content of document 120 and/or identifying groups of characters based on the training of CNN 140 and/or bounding box detector 150. In an embodiment, bounding box detector 150 may generate one or more bounding box masks which may include different granularities of bounding boxes (e.g., characters, words, sentences, and/or lines). After the generation of one or more bounding box masks, OCR system 110 may output the bounding box masks and/or combine the one or more bounding box masks with a segmentation mask to generate a version of document 120 with optically recognized characters. The one or more bounding box masks may also identify various granularities between characters of handwritten text and/or between handwritten and typewritten text.

Via the use of the one or more segmentation masks and bounding box masks, OCR system 110 may generate an OCR version of document 120 relative to applying conventional computer vision techniques. OCR system 110 may avoid resource-intensive computations used by OCR systems when performing sequential steps. In an embodiment, OCR system 110 may store the one or more segmentation masks and/or bounding box masks, along with document 120 and/or an OCR version of document 120. OCR system 110 may make this information available to other systems to perform further analysis related to the document. In an embodiment, OCR system 110 may utilize this information in a software application and/or may display the segmentation masks and/or bounding box masks on a display screen for user manipulation. Utilizing OCR system 110, computer systems may easily recognize the character content of a document 120 as well as extract the character information from document 120, including a distinction between handwritten and typewritten text.

After generating the one or more segmentation masks, bounding box masks, and/or the OCR version of document 120, OCR system 110 may input the OCR version of document 120 to a machine learning model, such as, for example, another convolutional neural network (CNN). The other CNN may process the document to extract relevant information, such as, for example, key-values or table information. Because document 120 has been converted from an image to include a character representation, the other CNN need not newly learn the characters. The other CNN may extract key-values in a faster manner and with increased accuracy compared to a raw pixel approach or a sequence tagging approach. Similarly, the other CNN may use the information indicating whether particular characters are handwritten or typewritten to perform further analysis. When processing the document, a machine learning algorithm or other artificial intelligence may analyze the OCR document 120 more quickly and with fewer processing steps relative to the original document 120. The machine learning algorithms may also more easily determine patterns from document 120.

Figure 2A:
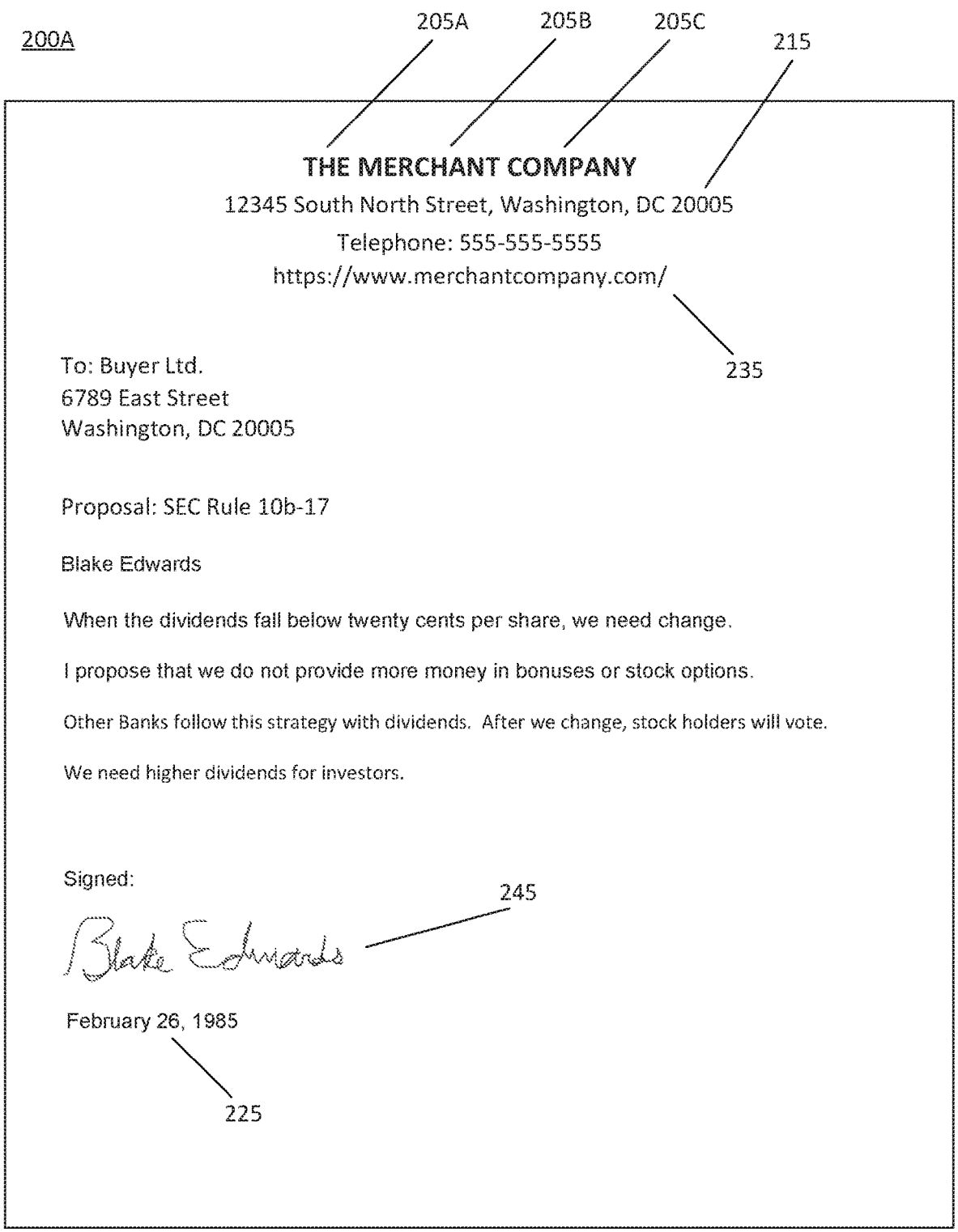
FIG. 2A depicts a block diagram of an example document, according to some embodiments.

FIG. 2A depicts a block diagram of an example document 200A, according to some embodiments. Document 200A may be analogous to document 120. In an embodiment, document 200A may include various combinations of characters. The characters and/or combinations of characters may be handwritten and/or typewritten. These combinations may include individual characters or groups of characters. These combinations may include letters, numbers, and/or symbols. The combinations may be, for example, words 205, numbers 215, dates 225, Internet addresses 235, and/or signatures 245. The characters may also include different languages. These combinations may be predefined groupings set for analysis by OCR system 110. An administrator of OCR system 110 may have defined these combinations as groupings of interest. In this manner, training CNN 140 may allow for improved accuracy in determining desired groupings for generating bounding boxes when OCR system 110 analyzes a document 120.

To generate bounding boxes, OCR system 110 may be trained to identify individual characters, words, and/or lines when generating bounding boxes. This training may be performed depending on the application of the output of OCR system 110. For example, if document 200A is meant to be processed by another document processing system, OCR system 110 may identify parameters or formatting suitable for input to the other document processing system. In some cases, the other document processing system may attempt to determine semantic information related to the words and/or the position of words of document 200A. In this manner, CNN 140 of OCR system 110 may be trained to group characters into words.

OCR system 110 may identify words 205 based on language and/or a dictionary mapping. In document 200A, OCR system 110 may identify "THE" as a word 205A, "MERCHANT" as a word 205B, and "COMPANY" as a word 205C. OCR system 110 may assign metadata indicating this grouping of characters as a word. This characterization may aid in the OCR process and may allow OCR system 110 to compare words to dictionaries to confirm whether the index mapping process is correct. OCR system 110 may distinguish words 205 from other groups of characters such as numbers 215.

OCR system 110 may identify groups of numbers 215 and/or associate the groups of numbers with metadata. OCR system 110 may convert these numbers to index values so that they may be identified in the segmentation mask along with letters. OCR system 110 may also identify groupings having a combination of numbers and letters such as, for example, dates 225. Even though this grouping may include both numbers and letters, OCR system 110 may be able to index each character of the grouping as well as identify the grouping with bounding boxes. This processing may yield a bounding box mask that may be utilized in another document processing system to, for example, determine semantic information related to document 200A.

OCR system 110 may also identify Internet address 235. OCR system 110 may identify a grouping of letters, numbers, and/or symbols in this manner. OCR system 110 may index each character of Internet address 235 and recognize the grouping of characters.

OCR system 110 may also identify signatures 245. OCR system 110 may recognize that signature 245 is handwritten text based on the training of CNN 140. OCR system 110 may identify that this text differs from the other typewritten text of document 200A. In view of this distinction, OCR system 110 may generate a type grid segmentation mask.

OCR system 110 may also identify characters, either handwritten or typewritten, from different languages. Based on the training and/or dictionary mapping implemented by OCR system 110, OCR system 110 may identify symbols or characters from multiple languages. Each distinct symbol may be mapped to a different index value to differentiate between the symbols. Further, OCR system 110 may group symbols of different languages together based on the construction of document 200A. Within this grouping, OCR system 10 may differentiate the symbols using the index value.

While document 200A may include many disparate types of character groupings, OCR system 110 may identify different groupings of characters and/or map an index value to each character of document 200A. This mapping may map index values to both handwritten and typewritten characters and/or correlate characters to index values across the different character types.

Figure 2B:
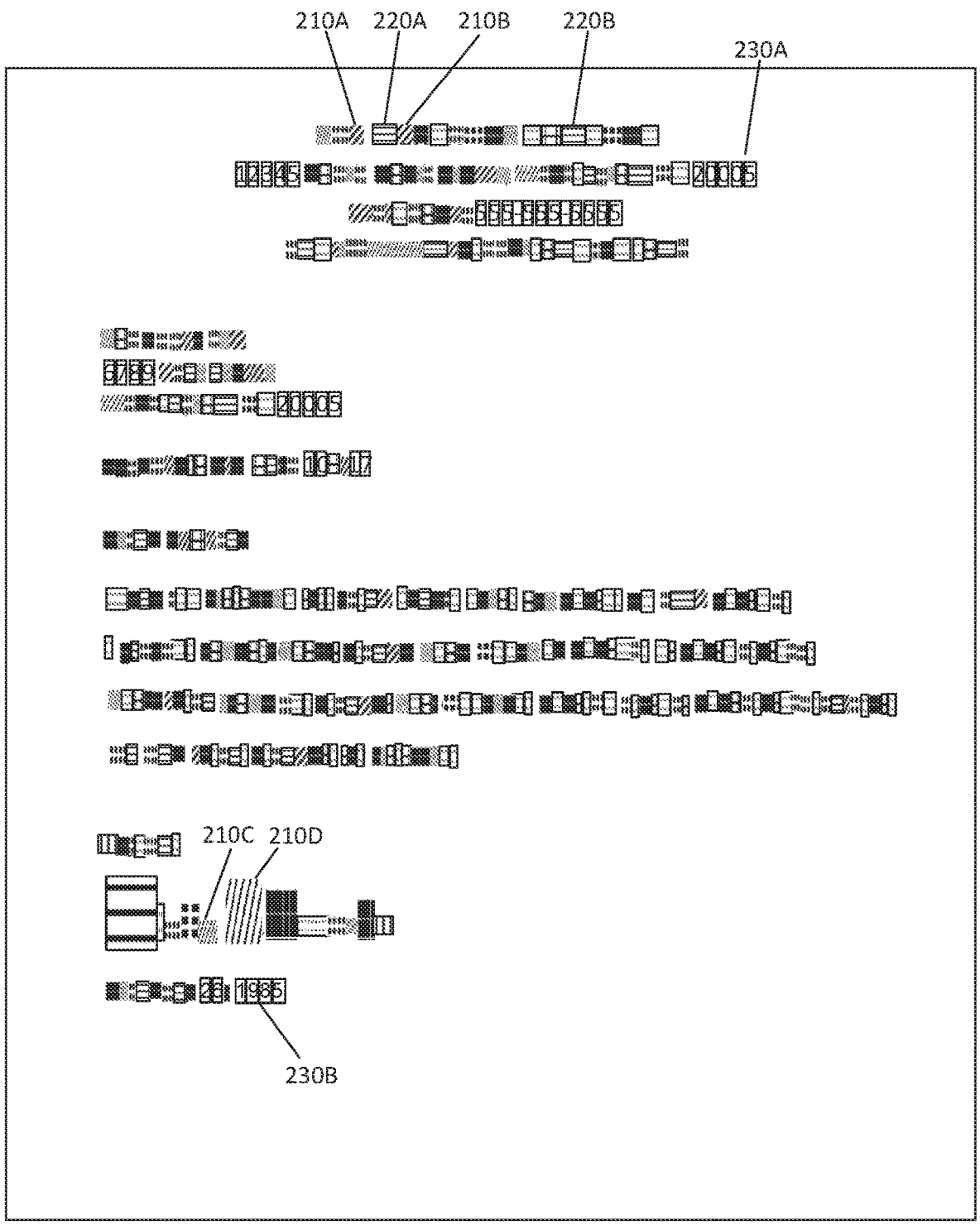
FIG. 2B depicts a block diagram of an example character grid segmentation mask, according to some embodiments.

FIG. 2B depicts a block diagram of an example character grid segmentation mask 200B, according to some embodiments. OCR system 110 may generate character grid segmentation mask 200B after analyzing document 200A depicted in FIG. 2A. Character grid segmentation mask 200B may include index values that corresponding to each character of document 200A. Segmentation mask 200B may use patterns and/or colors to characterize the portions of document 200A having the same index value. This indexing and/or hashing may occur similar to the conversion of string 420 to string 430 as depicted in FIG. 4. Each character of document 200A may be replaced with an index value based on OCR system 110 identifying an index value corresponding to the pixel information of the character information of the image of document 200A. OCR system 110 may identify an index value for a matching pixel configuration for a character. OCR system 110 may train a mapping algorithm by supplying multiple training examples to CNN 140.

OCR system 110 may correlate distinct characters to distinct index values. For example, in document 200A, OCR system 110 may correlate every letter "E" with the same index value. In segmentation mask 200B, OCR system 110 may correlate this index value with the same color or pattern so that each instance of the letter "E" appears with the same visual indication. To demonstrate an example embodiment, OCR system 110 may use the same visual indicator to mark the letter "E" at 210A from the word "THE" along with the letter "E" at 210B from the word "MERCHANT". Similarly, OCR system 110 may identify the handwritten instances of the letter "E" at 210C and 210D from the signature of "Blake Edwards". In this manner, OCR system 110 may identify the same characters from handwritten and typewritten characters and mark them using the same index value.

OCR system 110 may also use the same visual indicator to mark the letter "M" at 220A from the word "MERCHANT" along with the letter "M" at 220B from the word "COMPANY". The visual indicators for the letter "E" and the letter "M", however, may differ to indicate a different index value for the characters. OCR system 110 may also use the same index value or different index values to unify or differentiate between lower-case or capital letters.

In an embodiment, depending on how OCR system 110 was trained to identify, character and/or map the characters to an index value, OCR system 110 may identify different index values for different character formatting. For example, the letter "M" at 220A from the word "MERCHANT" along with the letter "M" at 220B from the word "COMPANY" may be mapped to a first index value because the letters use the same formatting. For example, the letters use the same font size and embellishment, such as, for example, bolding or italics. A different letter "M" from a different word, however, may be mapped to a different index value because it does not include the same embellishment. In this manner, a reconstruction of document 200A with optically recognized text may preserve the formatting of the characters in addition to the character information itself. This formatting preservation may depend on the training specified for OCR system 110. This indexing may occur for typewritten and/or handwritten characters.

In addition to using an index value to represent a letter, OCR system 110 may identify numbers 230A-230B and/or provide an index value for the numbers. The numeric index value may correspond to the number itself and/or may be a different index value. Similarly, OCR system 110 may identify decimal values in the numbering. Based on the training of OCR system 110 to recognize symbols and to generate mapping functions to index the symbols, OCR system 110 may support multiple languages and may allow for increased scalability using the neural network architecture. The numbering, symbols, and different characters may also be indexed for both typewritten and handwritten characters.

Based on the conversion of characters, OCR system 110 may replace each identified character with an index value. In some instances, a document 200A may include graphics and/or a background that does not include character information. In this case, OCR system 110 may not supply an index value on character grid segmentation mask 200B. Instead, OCR system 110 may classify the space as background area which may appear as "white space" on character grid segmentation mask 200B. This classification may aid in document processing and may allow another document processing system to avoid analyzing the blank space and instead process the character information. Having this information allows the other document processing system to continue to avoid pixel-based analysis which may be slow and resource intensive. The other document processing system may instead use character grid segmentation mask 200B, type grid segmentation mask 200C, and/or bounding box masks 200D and/or 200E as described with reference to FIG. 2C, 2D and FIG. 2E to provide further document analysis.

In an embodiment, OCR system 110 may use character grid segmentation mask 200B as an output to represent the OCR version of document 120. To supply additional information, OCR system 110 may use character grid segmentation mask 200B along with type grid segmentation mask 200C, bounding box mask 200D, and/or bound box mask 200E to generate a version of document 200A with optically recognized text. OCR system 110 may combine character grid segmentation mask 200B with type grid segmentation mask 200C, bounding box mask 200D, and/or bound box mask 200E to generate a version of document 120 with optically recognized text.

After the generation of character grid segmentation mask 200B, type grid segmentation mask 200C, and/or bounding box mask 200D and/or 200E, OCR system 110 may store segmentation masks 200B, 200C and/or bounding box mask 200D, 200E along with document 120 and/or an OCR version of document 120. OCR system 110 may make this information available to other systems to perform further analysis related to the document. In an embodiment, OCR system 110 may utilize this information in a software application and/or may display character grid segmentation mask 200B, type grid segmentation mask 200C, and/or bounding box mask 200D and/or 200E on a display screen for user manipulation. In an embodiment, OCR system 110 may output segmentation mask 200B, 200C and/or bounding box mask 200D and/or 200E via a JSON formatted file.

Figure 2C:
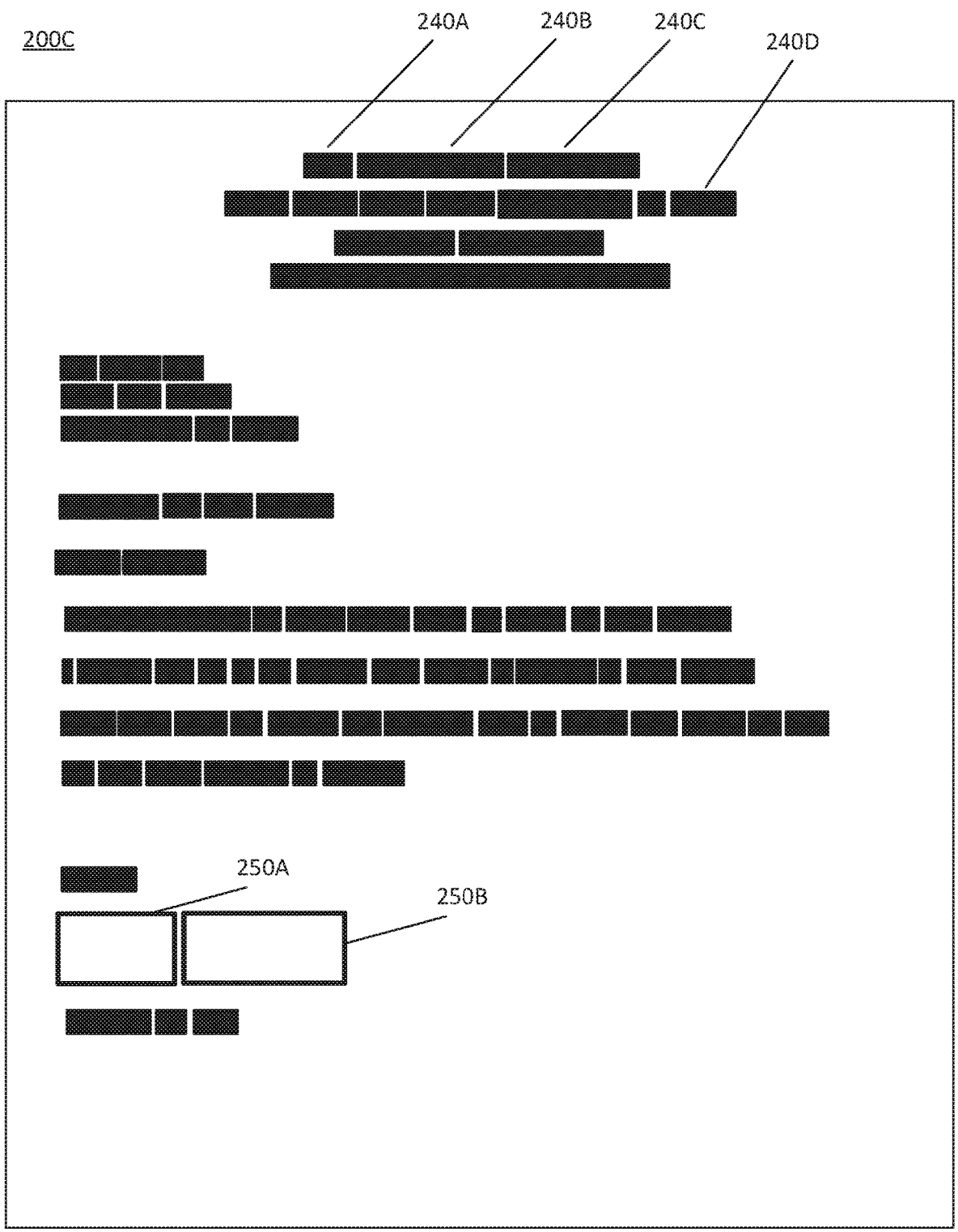
FIG. 2C depicts a block diagram of an example type grid segmentation mask, according to some embodiments.

FIG. 2C depicts a block diagram of an example type grid segmentation mask 200C, according to some embodiments. As previously described, type grid segmentation mask 200C may indicate different pixel groupings between handwritten characters, typewritten characters, and/or background. For example, OCR system 110 may identify typewritten characters and/or words 240 using a particular value while using a different value for handwritten characters or words 250.

Depending on the training of CNN 140, OCR system 110 may identify different types of characters beyond the distinction between handwritten and typewritten characters. For example, OCR system 110 may identify different fonts used for different typewritten characters. OCR system 110 may also be trained to identify handwriting from different individuals. OCR system 110 may then categorize different handwriting styles in type grid segmentation mask 200C. Training CNN 140 with different types of handwriting data sets may allow OCR system 110 to identify differences between handwritten and typewritten characters as well as may allow OCR system 110 to recognize distinctions between different handwriting patterns. These differences may be composed and/or viewed using type grid segmentation mask 200C.

Similar to the grouping of handwritten and typewritten characters, OCR system 110 may be configured to group different characters depending on the formatting of the characters. For example, the grouping may include different fonts or stylistic details. In an embodiment, type grid segmentation mask 200C may identify the handwriting of different individuals. In an embodiment, the type grid segmentation mask may also be used to group a first subset of characters from a first language while grouping a second subset of characters from a second language. In this manner, type grid segmentation mask 200C may group different character formats in view of the training data supplied to OCR system 110. To delineate the different formatting, segmentation mask 200C may use different colors to generate a visual depiction of the differences. For example, typewritten characters and/or words 240 may be depicted using a first color while handwritten characters or words 250 may be depicted using a second color.

Figure 2D:
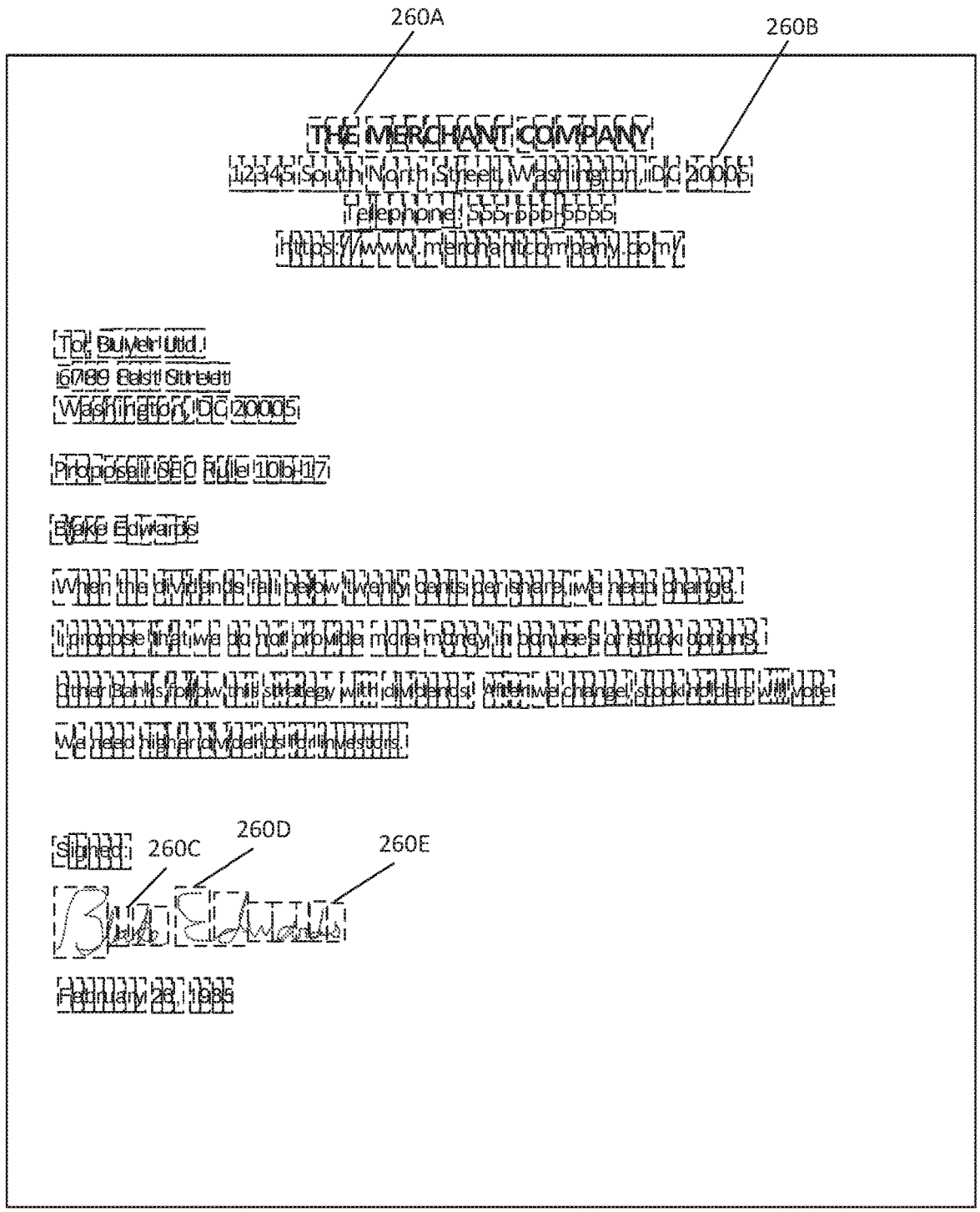
FIG. 2D depicts a block diagram of an example bounding box mask including character bounding boxes, according to some embodiments.

In addition to producing character grid segmentation mask 200B and/or type grid segmentation mask 200C, OCR system 110 may generate a bounding box mask 200D. FIG. 2D depicts a block diagram of an example bounding box mask 200D including character bounding boxes, according to some embodiments. To generate bounding box mask 200D, OCR system 110 may utilize bounding box detector 150. Bounding box detector 150 may aid in identifying different instances of a grouping of characters. Bounding box detector 150 may produce a bounding box mask 200D to aid in this process. For example, bounding box mask 200D may include bounding boxes 260A-260E.

Bounding box mask 200D may include bounding boxes around characters of document 120. In this case, the bounding boxes may be differently sized across different sizes of text. For example, while typewritten characters may be uniform in size, handwritten characters may have more variation in size. In this case, the bounding boxes 260 around the characters may vary in size. While the sizes may vary, bounding boxes 260 may indicate that particular characters are distinct. For example, in a written signature or manuscript where characters may have different heights and/or widths, a bounding box 260 may aid in delineating between characters of the signature.

Figure 2E:
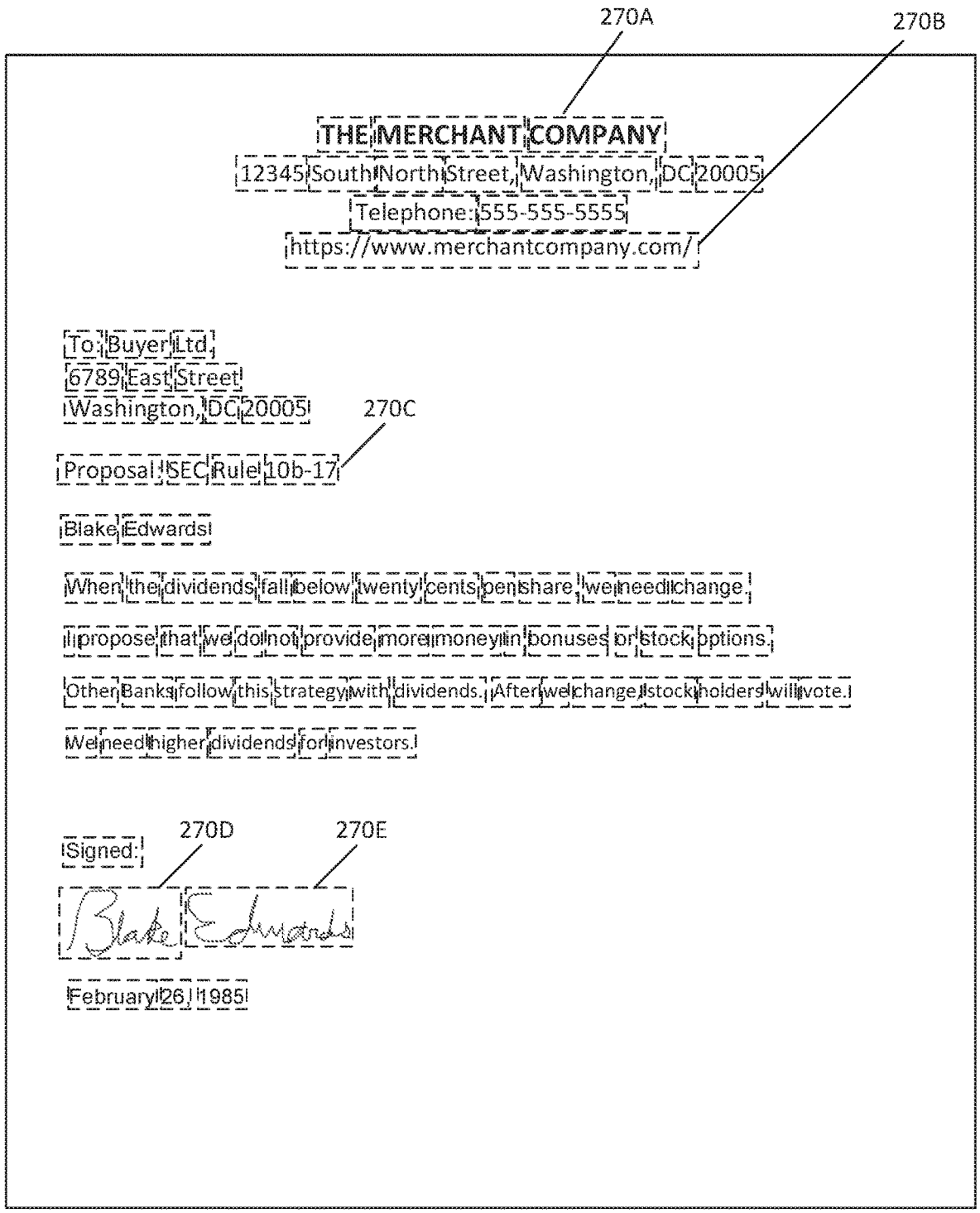
FIG. 2E depicts a block diagram of an example bounding box mask including word bounding boxes, according to some embodiments.

FIG. 2E depicts a block diagram of an example bounding box mask 200E including word bounding boxes, according to some embodiments. To generate bounding box mask 200E, OCR system 110 may utilize bounding box detector 150. Bounding box detector 150 may aid in identifying different instances of a grouping of characters. Bounding box detector 150 may produce bounding box mask 200E to aid in this process. For example, bounding box mask 200E may include bounding boxes 270A-270E.

Bounding boxes 270A-270E may identify different instances of groups of characters depending on the configurations and training of OCR system 110. For example, if CNN 140 is trained to identify words, bounding boxes 270A-270E may identify words. The embodiment depicted in FIG. 2E includes an example of a word bounding box 270A. Word bounding box 270A identifies the group of characters identifying the word "COMPANY". To generate word bounding box 270A, OCR system 110 may identify white space and/or gaps between groups of letters. In some embodiments, OCR system 110 may identify the grouping of index values to determine a word. For example, after mapping the index values to the characters, OCR system 110 may consult a dictionary to identify a particular group of characters as a word. OCR system 110 may then generate word bounding box 270A.

Similar to words, OCR system 110 may generate an Internet address bounding box 270B. The Internet address bounding box may signify a group of character representing an Internet address, website, or Uniform Resource Locator (URL). OCR system 110 may be trained to identify Internet addresses separately from words through the identification of the structure of the Internet address. In this manner, OCR system 110 may not identify the individual words of the Internet address. In some embodiments, however, OCR system 110 may be trained to identify the individual words depending on the application and whether OCR system 110 is configured to identify words of the Internet address.

OCR system 110 may also generate number bounding box 270C. Number bounding box 270C may signify a grouping of numbers and/or letters. Rather than recognizing individual characters as discrete instances, OCR system 110 may group the full set of numbers together with number bounding box 270C. For example, rather than identify five number of 3-4-2-8-9, OCR system 110 may group these numbers together to form "thirty-four thousand, two hundred eighty-nine." This grouping may aid in the processing and categorization of information on document 120 and may appear as an output of OCR system 110 in bounding box mask 200E. Other bounding box types may include date bounding boxes, punctuation bounding boxes, and/or bounding boxes indicating different languages.

OCR system 110 may also generate handwriting bounding boxes 270D and 270E. Handwriting bounding boxes 270D and 270E may be similar to word bound box 270A and identify handwritten words. Handwriting bounding boxes 270D and 270E may also identify letters and/or numbers that are grouped together. In an embodiment, the handwriting bounding boxes 270D and 270E may identify handwritten words that may be written using script or cursive. The handwriting bounding boxes 270D and 270E may delineate between letters that may be written in a connected manner.

While FIG. 2E displays a bounding box mask 200E with bounding boxes for words, OCR system 110 may be configured to produce one or more bounding box masks 200E with different granularity. For example, OCR system 110 may generate a word bounding box mask 200E, a character bounding box mask 200D, a line bounding box mask, and/or a sentence bounding box mask. Each mask may include different bounding boxes marking different categories of characters. Using these one or more bounding box masks along with segmentation mask 200B may allow OCR system 110 to generate a version of document 120 having optically recognized text. OCR system 110 may also provide the one or more bounding box masks as outputs to be used in a document processing system. Having this grouping information, the document processing system may be able to process semantic and/or contextual information may avoid needing to separate words or character groupings and may perform processing in a faster manner.

Figure 3:
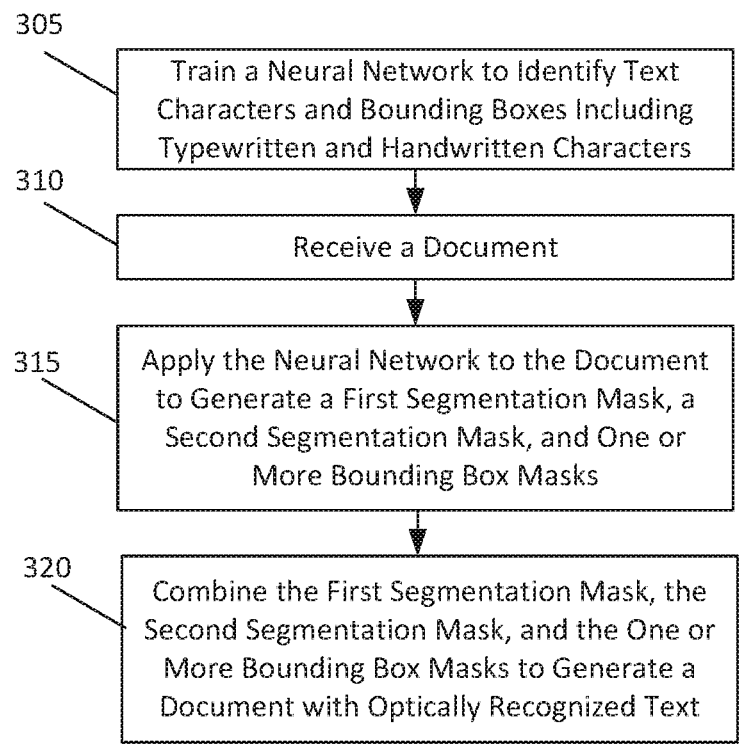
FIG. 3 depicts a flowchart illustrating a method for recognizing characters of a document, according to some embodiments.

FIG. 3 depicts a flowchart illustrating a method 300 for recognizing characters of a document, according to some embodiments. Method 300 shall be described with reference to FIG. 1; however, method 300 is not limited to that example embodiment.

In an embodiment, OCR system 110 may utilize method 300 to process document 120. Document 120 may include handwritten and/or typewritten text. Method 300 may generate a version of document 120 having optically recognized text. The foregoing description will describe an embodiment of the execution of method 300 with respect to OCR system 110. While method 300 is described with reference to OCR system 110, method 300 may be executed on any computing device, such as, for example, the computer system described with reference to FIG. 5 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 3, as will be understood by a person of ordinary skill in the art.

At 305, OCR system 110 may train a neural network to identify text characters and bounding boxes including typewritten and handwritten characters. The neural network may be CNN 140. Training CNN 140 may include providing a package of data including examples of pixelated characters with a corresponding index value. By performing many comparison, CNN 140 may identify characters based on recognized pixel arrangements and map newly analyzed pixel information to an index value. Further, using different configurations of characters, such as printed letters, typewritten letters, and hand-written letters, the mapping functions of CNN 140 may be adaptable to identify different pixel configurations of the same character. CNN 140 may also identify different fonts or embellishments depending on the training data received.

While OCR system 110 may be trained to identify characters such as letters or numbers, OCR system 110 may be customized based on training to identify particular symbols. For example, OCR system 110 may identify multiple languages by mapping identified pixel information to an index value. By building a library or dictionary of symbols, OCR system 110 may provide scalability to identify multiple symbols across different languages. Further, OCR system 110 may be used in an idiosyncratic manner and may identify symbols that do not follow a traditional alphabet. For example, a user may an image or illustration in the training data with a corresponding index value. In this case, OCR system 110 may associate the designated index value when identifying new documents 120 that include the image or illustration. For example, if the training data includes images of cats, if OCR system 110 identifies a cat based on detected pixel patterns of document 120, OCR system 110 may use an index value to represent the cat in the document 120. In this manner, character recognition may be scaled to include images as well as text.

OCR system 110 may also be trained to differentiate and identify differences between handwritten and typewritten text. OCR system 110 may be trained to denote these differences when later generating a type grid segmentation mask. OCR system 110 may also still identify characters that are the same when typewritten or handwritten. In this case, OCR system 110 may use the same index value when constructing a character grid segmentation mask. For example, the character grid segmentation mask may use the same index value for a particular letter regardless of whether the letter is handwritten or typewritten.

In addition to character recognition, OCR system 110 may train CNN 140 to identify bounding boxes. The training of bounding box detection may be performed based on the desired output bounding box mask 200D and/or 200E. For example, if the output of OCR system 110 is to be input into a document processing system, the document processing system may wish to receive bounding box mask 200D with bounding boxes identifying characters and/or bounding box mask 200E with bounding boxes grouping words. In this case, the training of CNN 140 may include dictionary data and/or other data to identify patterns of index values or pixel characters to generate word bounding boxes. Similarly, the training data may include information for pattern recognition of structures of characters to identify words. For example, the training data may include date information to train CNN 140 to identify date structures and to generate a date bounding box. The training data may further include an identification of Internet address information, symbols, numbers, and/or other groupings of characters deemed significant by a user of OCR system 110. Using the training data, OCR system 110 may generate one or more bounding box masks depending on the granularity specified in the training data. For example, the training data may cause CNN 140 to identify bounding boxes around each character. In an embodiment, CNN 140 may generate bounding boxes around words, lines; and/or sentences depending on the training package.

OCR system 110 may receive the training package from a user configuring OCR system 110. In this manner, OCR system 110 may be customized depending on the application and the types of documents 120 analyzed. This customization may yield more accurate results and/or may improve character recognition times because the training data may be more focused. Training CNN 140 to identify particular patterns of importance may yield faster pattern recognition and/or indexing of characters. In an embodiment, CNN 140 may be a general or all-purpose character recognition system and may use a default training package. Further, training may not be a discrete step and may be a continual process while OCR system 110 continues to analyze documents 120. Via user input correction, CN 140 may continue to become more robust in pattern recognition.

At 310, OCR system 110 may receive a document 120. Document 120 may be a file including text. For example, document 120 may be an image, word processing document, PDF file, screenshot; and/or a combination of text and images. In an embodiment, document 120 may be a scanned document and/or may contain multiple pages and/or slides.

In an embodiment, OCR system 110 may be a standalone system configured to receive document 120 and determine character information from document 120. OCR system 110 may store this character information in a memory device and/or a database. In an embodiment, OCR system 110 may communicate with a separate system, such as, for example, a document processing system. OCR system 110 may also transmit the character information to the separate system. OCR system 110 may be integrated with another system. For example, OCR system 110 may serve as a component of a larger system. In this case, OCR system 110 may receive the document 120 from a location directed by the larger system. The larger system may direct OCR system 110 to direct identified character information to a particular location.

At 315, OCR system 110 may apply the neural network to document 120 to generate a first segmentation mask, a second segmentation mask, and/or one or more bounding box masks. The first segmentation mask may be character grid segmentation mask 200B while the second segmentation mask may be type grid segmentation mask 200C. Depending on the different training data, OCR system 110 may also generate other types of segmentation masks, such as, for example, segmentation masks identifying different fonts, different handwriting belonging to different individuals, or other document formatting distinctions. The bounding box masks may be bounding box mask 200D and/or 200E and/or may include different granularities of bounding boxes.

Applying CNN 140 to document 120 may begin the optical character recognition process on document 120 to obtain character and position information. The character information may relate to letters, numbers, symbols, words, a collection or combination of letters, numbers, and/or symbols, symbolic mark, an image, and/or other visual indicators on a document. OCR system 110 may identify word and/or character strings. OCR system 110 may identify the location of the characters within document 120. OCR system 110 may perform a pixel-based analysis to identify the characters and position information. This analysis may also identify whether particular pixels are typewritten or handwritten.

Based on the training of CNN 140, OCR system 110 may generate the character grid segmentation mask 200B using character semantic segmentation generator 160. OCR system 110 may identify specified characters of document 120 according to the training data supplied. In this manner, the character information may include numbers, letters, and/or symbols as specified by the training data. Distinct characters may be mapped to distinct index values so that each character may be uniquely identified. Character semantic segmentation generator 160 may combine the index information with a coordinate system to map the index values to the corresponding locations of document 120 to generate character grid segmentation mask 200B. Using type semantic segmentation generator 170, OCR system 110 may also generate type grid segmentation mask 200C using the identified handwritten, typewritten, or background information. In an embodiment, character grid segmentation mask 200B and/or type grid segmentation mask 200C may be used without bounding box mask 200D and/or 200E to represent an OCR version of document 120.

In cases where bounding box mask 200D and/or 200E is used, based on the training of CNN 140, OCR system 110 may generate bounding box mask 200D and/or 200E1: using bounding box detector 150. OCR system 110 may identify specified groupings of characters, including individual characters, words, lines and/or sentences as specified by the training data. In an embodiment, OCR system 110 may not generate a bounding box mask 200D and/or 200E and instead may rely on character grid segmentation mask 200B to designate the character positions. In the other groupings; OCR system 110 may generate bounding boxes around the groups of characters according to the training data. Bounding box detector 150 may combine the bounding boxes with a coordinate system to map the bounding boxes to the corresponding locations of document 120 to generate bounding box mask 200D and/or 200E.

After generating segmentation masks 200B, 200C and/or bounding box mask 200D and/or 200E, OCR system 110 may supply these masks as outputs to a separate system. Depending on the configurations of the system, these outputs may be desired as a type of pre-processing to extract desired character information as well as hashing the character information to an index value with location information. Similarly, if desired, OCR system 110 may be configured to generate a display of segmentation masks 200B, 200C and/or bounding box mask 200D and/or 200E on a graphical user interface for a user to view and/or manipulate. In an embodiment, a user may wish for OCR system 110 to produce an OCR version of document 120. In this case, OCR system 110 may perform 320.

At 320, OCR system 110 may combine the first segmentation mask, the second segmentation mask; and the one or more bounding box masks to generate a document 120 with optically recognized text. The first segmentation mask may be character grid segmentation mask 200B; the second segmentation mask may be type grid segmentation mask 200C; and the one or more bounding box masks may include bounding box masks 200C and/or 200D. Combining segmentation masks 200B, 200C and bounding box mask 200D and/or 200E may include adding one or more layers over the image of document 120. For example, a user version of the OCR version of document 120 may allow viewing of the image of document 120 and also allow interaction with segmentation masks 200B, 200C and/or bounding box mask 200D and/or 200E. For example, a user may highlight and/or select characters of character grid segmentation mask 200B to copy into different applications or documents. This copying may include copying the index values represented in character grid segmentation mask 200B. While the computer system may maintain this correlation, a user may visually see characters as they are displayed rather than the index values. This visualization aspect may aid a user in reviewing an OCR version of document 120.

In some embodiments, the use of character grid segmentation mask 200B without bounding box mask 200D and/or 200E may be sufficient for OCR purposes. In this case, the overlay of character grid segmentation mask 200B over document 120 may represent the OCR version of document 120. In an embodiment, if the subsequent application of the OCR version of the document requires a distinction between handwritten and typewritten characters, type grid segmentation mask 200C may also be produced. In some embodiments, supplying additional information via bounding box mask 200D and/or 200E may be desired.

A user may interact with bounding box mask 200D and/or 200DE Selecting bounding boxes may allow a user to quickly select groups of characters as grouped in bounding box mask 200E. In an embodiment, a user may interact with a graphical user interface to toggle the view of segmentation masks 200B, 200C and/or bounding box mask 200D and/or 200E. Viewing bounding box mask 200D may also aid in identifying different handwritten characters that may be merged, combined, or difficult to parse visually. To visualize the differences in characters or character groupings, a user may wish to view the bounding boxes as an overlay on top of document 120. The user may select a toggle button to hide or show the bounding boxes. Similarly, the user may wish to visualize the index values of character grid segmentation mask 200B and/or highlighting on type grid segmentation mask 200C. In this manner, the user may select a toggle button to display the colors and/or patterns assigned to the characters of the segmentation masks 200B and/or 200C.

Based on the combination of the segmentation masks 200B, 200C and bounding box mask 200D, 200E, OCR system 110 may produce a version of document 120 having optically recognized text. The version may also distinguish between handwritten and typewritten text but may also be configured to distinguish between other types of text formatting. This OCR process may be performed with fewer steps relative to sequential OCR processes. Further, this OCR process reduces the computational costs using CNN 140 and may lead to a reduction in the number of errors due to loss or distortion during intermediate OCR steps. Using CNN 140 may streamline the OCR process to yield faster and more accurate character recognition results.

Figure 5:
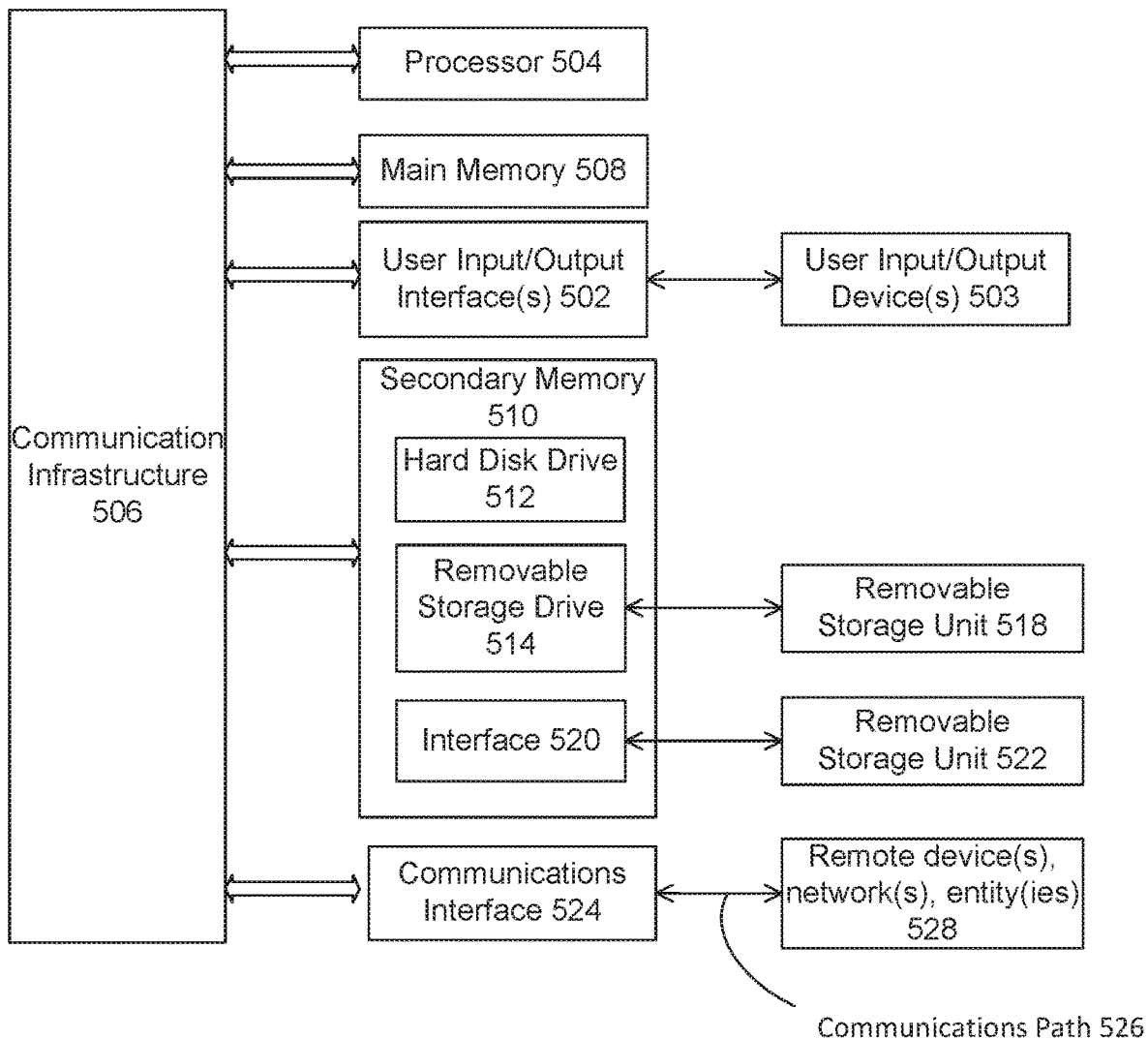
FIG. 5 depicts an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, MID, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone; smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (Paas), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, for mats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still cooperate or interact with each other.

The breadth and scope of this disclosure should not be limited by any of the above-described exemplary embodiments, but should be defined only in accordance with the following claims and their equivalents.

What is claimed is:

1. A computer implemented method, comprising:
   receiving a document image;
   analyzing pixels of the document image using a neural network to identify characters of the document image and formatting of the characters;
   generating a first segmentation mask using the neural network, wherein index values replace the characters; and
   generating a second segmentation mask using the neural network to distinguish a first subset of characters of the document image from a second subset of characters of the document image, wherein the formatting of the first subset of characters differs from the formatting of the second subset of characters.

2. The computer implemented method of claim 1, wherein the formatting of the first subset of characters includes handwritten text and the formatting of the second subset of characters includes typewritten text.

3. The computer implemented method of claim 1, further comprising:
   generating one or more bounding boxes indicating groups of characters in the document image; and
   combining the one or more bounding boxes into a bounding box mask, wherein the one or more bounding boxes are located in positions corresponding to the groups of characters in the document image.

4. The computer implemented method of claim 3, further comprising:
   overlaying the first segmentation mask; the second segmentation mask, and the bounding box mask on the document image.

5. The computer implemented method of claim 1, wherein the formatting of the first subset of characters includes a first language and the formatting of the second subset of characters includes a second language.

6. The computer implemented method of claim 1, wherein the formatting of the first subset of characters includes handwriting corresponding to a first individual and the formatting of the second subset of characters includes handwriting corresponding to a second individual.

7. The computer implemented method of claim 1, wherein the second segmentation mask includes a first color for the first subset of characters and a second color that differs from the first color for the second subset of characters.

8. A system, comprising:
   a memory; and
   at least one processor coupled to the memory and configured to:
   receive a document image;
   analyze pixels of the document mage using a neural network to identify characters of the document image and formatting of the characters;
   generate a first segmentation mask using the neural network, wherein index values replace the characters; and
   generate a second segmentation mask using the neural network to distinguish a first subset of characters of the document image from a second subset of characters of the document image, wherein the formatting of the first subset of characters differs from the formatting of the second subset of characters.

9. The system of claim 8, wherein the formatting of the first subset of characters includes handwritten text and the formatting of the second subset of characters includes typewritten text.

10. The system of claim 8, wherein the at least one processor is further configured to:
    generate one or more bounding boxes indicating groups of characters in the document image; and combine the one or more bounding boxes into a bounding box mask, wherein the one or more bounding boxes are located in positions corresponding to the groups of characters in the document image.

11. The system of claim 10, wherein the at least one processor is further configured to:
overlay the first segmentation mask, the second segmentation mask, and the bounding box mask on the document image.

12. The system of claim 8, wherein the formatting of the first subset of characters includes a first language and the formatting of the second subset of characters includes a second language.

13. The system of claim 8, wherein the formatting of the first subset of characters includes handwriting corresponding to a first individual and the formatting of the second subset of characters includes handwriting corresponding to a second individual.

14. The system of claim 8, wherein the second segmentation mask includes a first color for the first subset of characters and a second color that differs from the first color for the second subset of characters.

15. A non-transitory computer-readable device having instructions stored thereon that, when executed by at least one computing device, cause the at least one computing device to perform operations comprising:
receiving a document image;
analyzing pixels of the document image using a neural network to identify characters of the document image and formatting of the characters;
generating a first segmentation mask using the neural network, wherein index values replace the characters; and
generating a second segmentation mask using the neural network to distinguish a first subset of characters of the document image from a second subset of characters of the document image, wherein the formatting of the first subset of characters differs from the formatting of the second subset of characters.

16. The non-transitory computer-readable device of claim 15, the operations further comprising:
generating one or more bounding boxes indicating groups of characters in the document image;
combining the one or more bounding boxes into a bounding box mask, wherein the one or more bounding boxes are located in positions corresponding to the groups of characters in the document image; and
overlaying the first segmentation mask, the second segmentation mask, and the bounding box mask on the document image.

17. The non-transitory computer-readable device of claim 15, wherein the formatting of the first subset of characters includes handwritten text and the formatting of the second subset of characters includes typewritten text.

18. The non-transitory computer-readable device of claim 15, wherein the formatting of the first subset of characters includes a first language and the formatting of the second subset of characters includes a second language.

19. The non-transitory computer-readable device of claim 15, wherein the formatting of the first subset of characters includes handwriting corresponding to a first individual and the formatting of the second subset of characters includes handwriting corresponding to a second individual.

20. The non-transitory computer-readable device of claim 15, wherein the second segmentation mask includes a first color for the first subset of characters and a second color that differs from the first color for the second subset of characters.

* * * * *